(12) United States Patent
Maille

(10) Patent No.: US 6,503,137 B2
(45) Date of Patent: Jan. 7, 2003

(54) SHELLFISH CUTTING AND EATING UTENSILS

(75) Inventor: Michel Maille, St-Basil-le-Grand (CA)

(73) Assignee: Gestion Ramm Inc., Longueuil (CA)

( * ) Notice: Subject to any disclaimer, the term of this patent is extended or adjusted under 35 U.S.C. 154(b) by 1 day.

(21) Appl. No.: 09/837,705

(22) Filed: Apr. 18, 2001

(65) Prior Publication Data

US 2002/0019207 A1 Feb. 14, 2002

(30) Foreign Application Priority Data

Aug. 9, 2000 (GB) .............................................. 0019423

(51) Int. Cl.⁷ .............................................. A22C 29/02
(52) U.S. Cl. ........................... 452/17; 452/6; 30/120.1; 81/9.44; 81/418
(58) Field of Search ................................ 452/17, 6, 12, 452/13, 5; 30/111, 112, 113, 120.1, 120.3, 120.5; 7/129–135; 81/9.4, 9.44, 418, 420

(56) References Cited

U.S. PATENT DOCUMENTS

| 151,179 | A | * | 5/1874 | Waldie | 223/102 |
|---|---|---|---|---|---|
| 1,354,807 | A | * | 10/1920 | Dietrich | 248/216.1 |
| D118,280 | S | * | 5/1939 | Housmann | 71/132 |
| 2,778,254 | A | * | 1/1957 | Carapellotti | 30/431 |
| 3,872,528 | A | * | 3/1975 | Porter | 30/124 |
| 4,271,563 | A | * | 6/1981 | Theuman | 452/6 |
| 4,519,136 | A | * | 5/1985 | Walker | 30/142 |
| 4,658,456 | A | * | 4/1987 | Tsai | 7/135 |
| 5,564,145 | A | * | 10/1996 | Goldstein | 30/135 |
| 5,862,552 | A | * | 1/1999 | Koelewyn | 71/132 |
| 6,019,673 | A | * | 2/2000 | Saizon | 30/120.1 |

FOREIGN PATENT DOCUMENTS

GB          1464          * 10/1907

* cited by examiner

Primary Examiner—Peter M. Poon
Assistant Examiner—Chad Copier
(74) Attorney, Agent, or Firm—Eric Fincham

(57) ABSTRACT

A shellfish cutting utensil which has first and second elongated members pivotally connected together, each of the members having a jaw and a handle, one of the jaws having a recess or notch formed on an edge thereof and having a cutting edge. The cutting edge formed on the notch or recess can be utilized with a cutting edge on the other member in a scissors like movement for opening the shell of a shellfish.

16 Claims, 5 Drawing Sheets

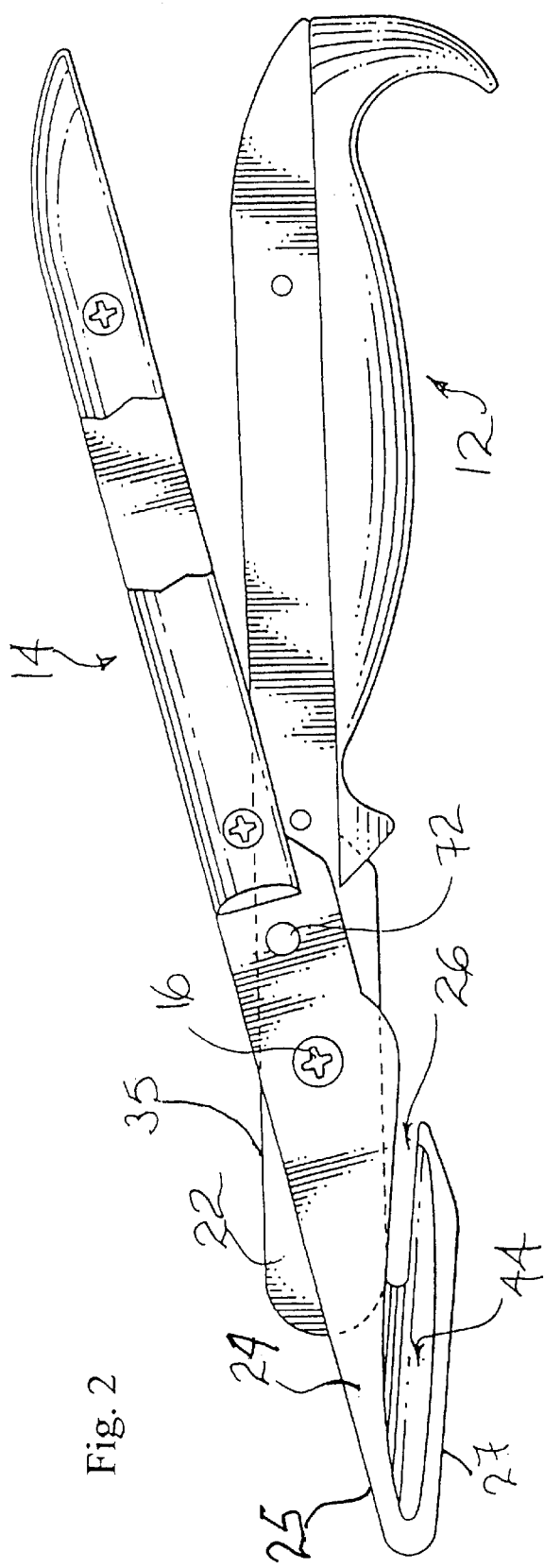
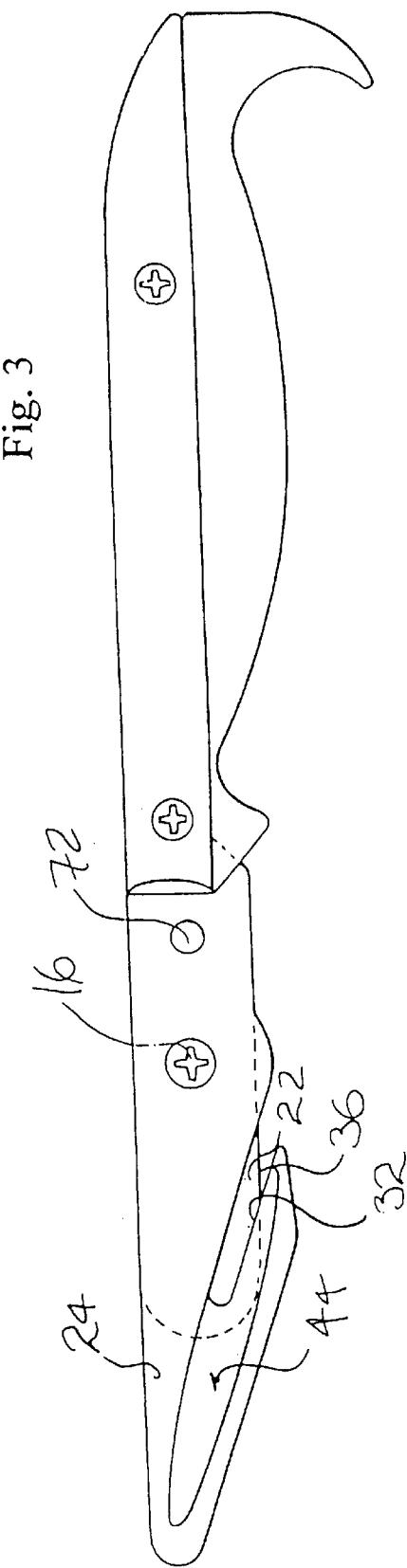
Fig. 2
Fig. 3

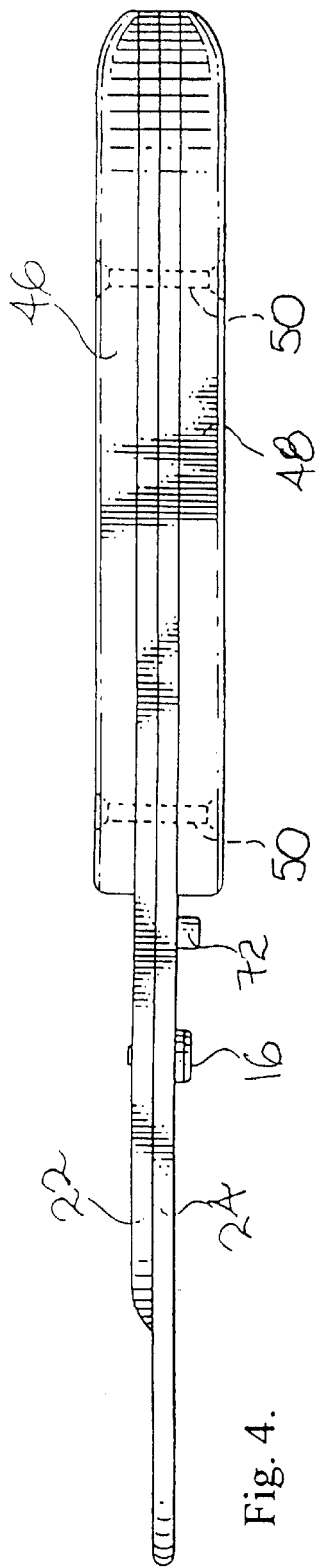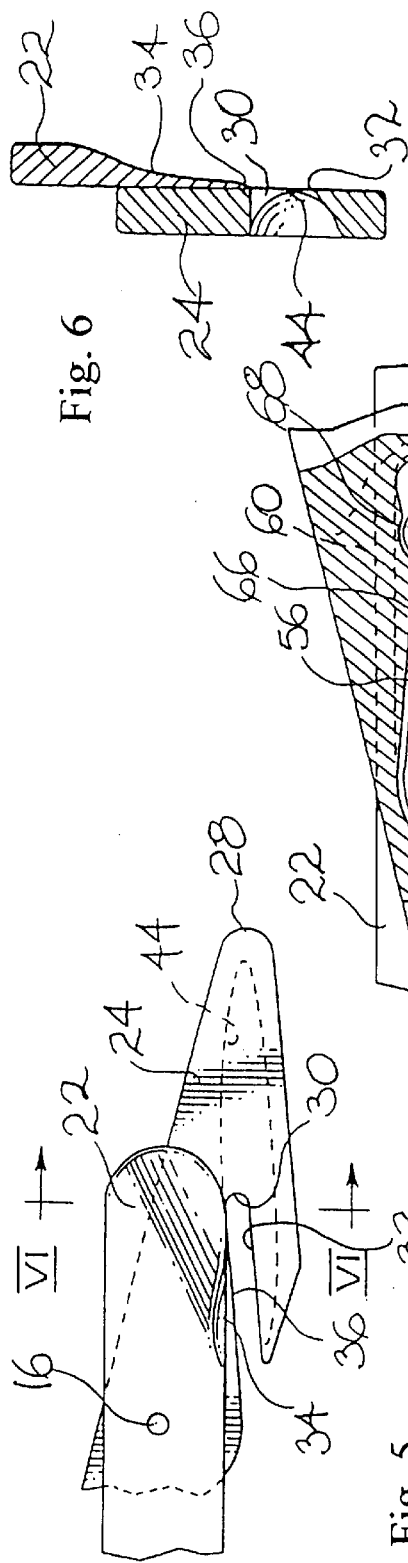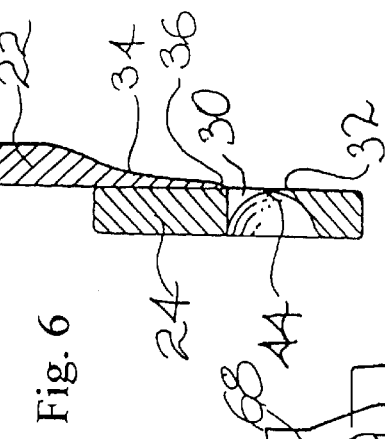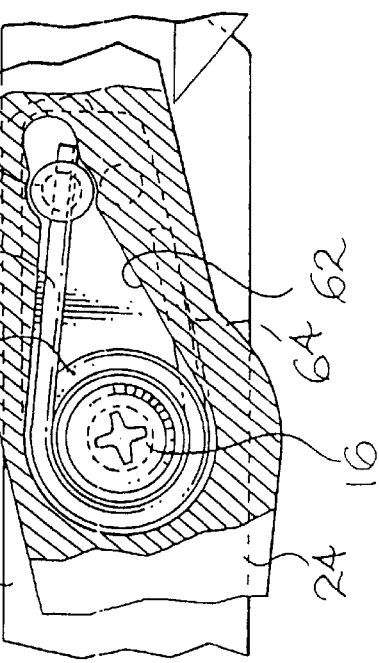
Fig. 4.
Fig. 5
Fig. 6
Fig. 7

SHELLFISH CUTTING AND EATING UTENSILS

FIELD OF THE INVENTION

The present invention relates to the general field of utensils and is particularly related to a shellfish cutting utensil.

BACKGROUND OF THE INVENTION

The popularity of shellfish such as lobsters, crabs, shrimp, scampi and the like is well known despite the relative difficulty encountered in eating the same. Indeed, shellfish are often served in their shell which must then be opened or removed in order to remove the edible portion.

Various tools and utensils have been proposed in the art for assisting an intended user in separating the meat from the hard shell portion of conventional shellfish. One particular class of tools or utensils utilizes the principle of cracking the shell.

Generally, such cracking tools have pivoting members providing for the placement of the shell to be cracked between the pivoting members. An intended user then applies a compressive force to the pivoting members to compress and crack the shellfish. A second type employs a hammer or mallet for cracking the shell. The shell is then removed in pieces to expose the meat.

Both the cracking and the hammering procedures can result in trauma to the hand from the sharp edges and projections of the shell. Also, protective clothing such as a bib or apron is usually necessary to avoid soiling underlying clothing.

Another drawback associated with such prior art methods relates to the fact that the compressive force imparted on the meat often damages the latter.

A second class of tool attempting to circumvent the herein above mentioned disadvantages by using a cutting action. The typical tool opens and closes like pliers with jaws that are notched and concave to hold the shellfish and crack the same when pressure is applied to the handles. This type of tool includes a relatively sharp severing section.

Another class of prior art tools involves the use of relatively sharp objects. One such tool includes a planar blade with an open handed slot extending linearly from a terminal end of the blade along the longitudinal axis of the blade. The slot symmetrically divides the blade into two identical sections. In use, one section of the knife is inserted into the interior of the shellfish section, with the other section straddling the exterior of the shell. By lifting upwardly on the knife, the knife is rotated about its terminal end and acts as lever to break the shell.

However, because a pointed edge is formed at the terminal end of the external fork by the linear slot, lifting of the utensil causes the pointed edge to piece the shell of the shellfish and result in an interrupted movement in opening the shell.

In addition, damage of the edible portion inside can result since the end of the section rotates into the shellfish meat.

A further problem with the foregoing manual cutting procedures is that the slicing operation can be very dangerous. The shellfish is typically wet and slippery when dressed often leading to mishandling of the shellfish or slicing implement during the slicing step and sometimes resulting in injury to the operator.

The potential for injury increases as the operator tries to speed up operations as is sometimes called for, and uses less care and caution than he/she would otherwise exercise.

Accordingly, the prior art devices heretofore proposed whether of the compressive or cutting or other types have proven to be unsatisfactory.

It is therefore an object of the present invention to provide a utensil or a tool suitable for the removal of the shell of a crustacean.

It is a further object of the present invention to provide a tool or utensil for the removal of a shell from a crustacean and which tool or utensil is easily manipulated and safe to use.

SUMMARY OF THE INVENTION

According to one aspect of the present invention, a utensil suitable for opening shellfish comprising a first elongated member having a first handle at a first end thereof and a first jaw at a second end thereof, a second elongated member having a second handle at a first end thereof and a second jaw at a second end thereof, the first and second elongated members being pivotally connected together and being pivotally moveable between a jaw open position and a jaw closed position, the first jaw having a first jaw exterior side edge and a first jaw interior side edge, the second jaw having a second jaw exterior side edge and a second jaw interior side edge, the first jaw inner side edge and the second jaw inner side edge being in a facing relationship when the first and second elongated members are in the open position, and the first jaw having a recess extending inwardly from the first jaw exterior side edge, the recess being defined by a recess side wall, the recess side wall having a cutting edge formed on at least a portion thereof.

Advantages of the present invention include that the proposed utensil is specifically designed for allowing an intended user to cut the shell thereof so as to facilitate separation of the meat from the shell. The proposed device sharply reduces splattering in the process of separating shell and meat. It also greatly reduces the risk of damaging the meat during the shell separation procedure.

Furthermore, the proposed tool allows for ergonomical handling thereof so as to provide a quick and easy method of separating the shell from the meat from conventional shellfishes while reducing the risk of injury to the intended user. The proposed utensil is further specifically designed so as to be used not only for cutting the shell of the shellfish but also so as to provide a tool for facilitating separation of the meat from the shell once the latter is severed.

Still further, the proposed utensil is specifically designed so as to be relatively easily and inexpensively manufacturable so as to provide a tool that will be sufficiently low in cost that it may be a single use device if needed.

The first and second elongated members are suitably connected together such that they may be pivotally moved with respect to each other between an open position and a closed position. The pivotal connection may take place either in the middle portion of the elongated members such that the elongated members resemble a pair of scissors or alternatively, the elongated members may be connected proximate the jaw end thereof such that the pivotal movement resembles that of a pair of crackers. In either instance, the elongated members may be pivotally connected by any suitable means such as a rivet, pivot pin, screw threaded arrangement, etc. In one particular embodiment, the elongated members may be connected together such that a space is provided therebetween. Such an arrangement facilitates the cleaning of the elongated members.

The elongated members may be formed of any suitable material. Thus, in a conventional arrangement, the major portion would be of a metallic material with the possibility that portions of the handle section may be formed of a further suitable material such as a plastic material. One could, for example, form the utensil completely of a stainless steel. However, for a lower manufacturing cost, a chrome plated carbon steel could be utilized. Alternatively, for an even lower manufacturing cost, the product could be formed of a plastic material which may optionally include a metallic portion forming the cutting edges.

BRIEF DESCRIPTION OF THE DRAWINGS

An embodiment of the present invention will now be disclosed, by way of example, in reference to the following drawings in which:

FIG. 2 is a front elevational view illustrating the utensil shown in FIG. 1 with the tool in an open configuration;

FIG. 3 is a front elevational view illustrating the utensil shown in FIGS. 1 and 2 in a closed configuration;

FIG. 4 is a top elevational view of the utensil shown in FIGS. 1 through 3;

FIG. 5 is a partial detailed front elevational view illustrating the distal section of the jaws;

FIG. 6 is a transversal cross sectional view taken along arrows VI—VI of FIG. 5;

FIG. 7 is a detailed front elevational view with sections taken out, illustrating part of a biasing mechanism for biasing the members which are open towards a predetermined configuration;

DESCRIPTION OF THE PREFERRED EMBODIMENTS

Figure 1:
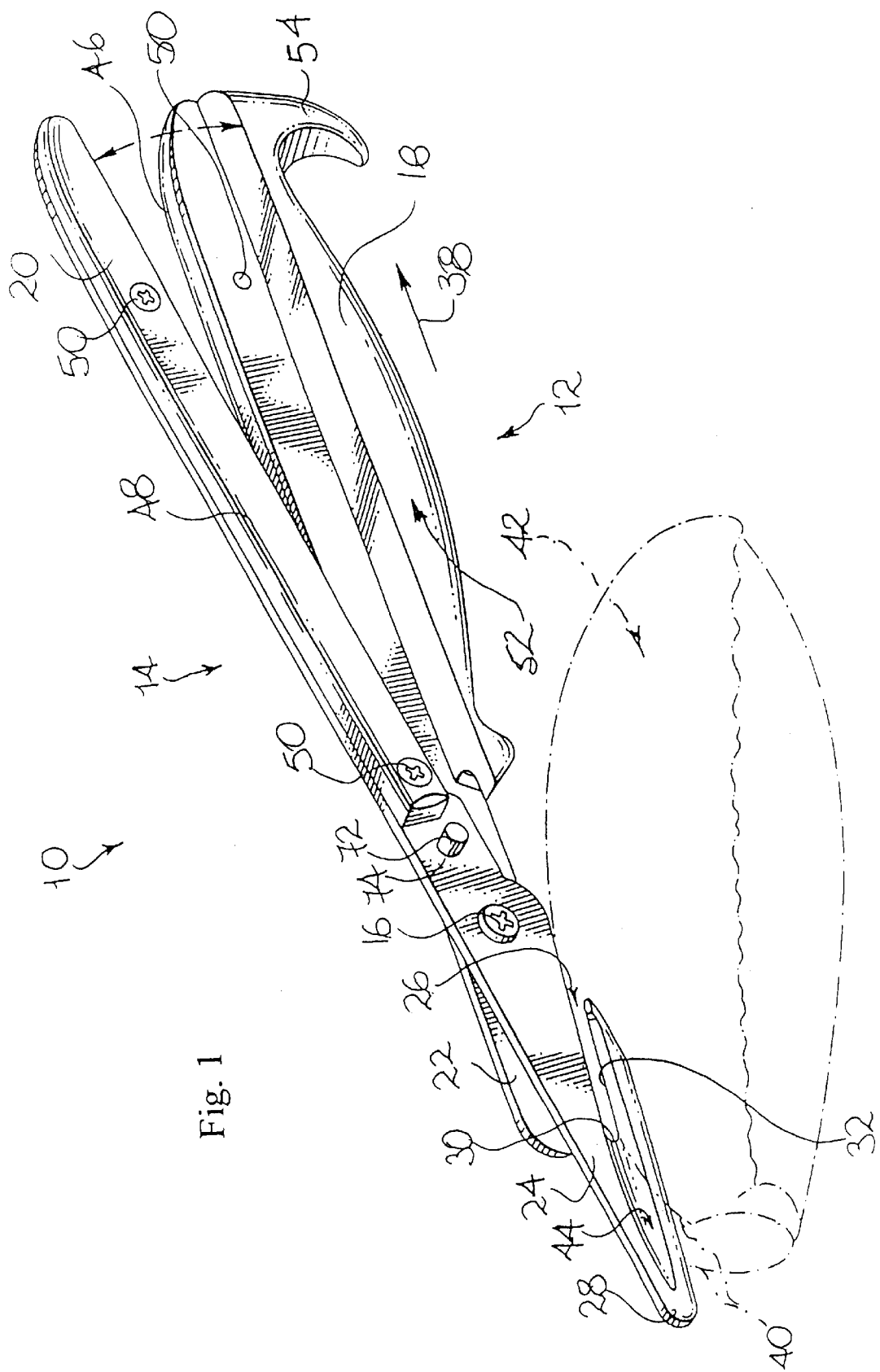
FIG. 1 is a perspective view illustrating a shellfish cutting and eating utensil in accordance with an embodiment of the present invention being used for cutting the outer shell of a conventional lobster claw.

Referring to FIG. 1, there is shown a seashell cutting and eating tool or utensil in accordance with an embodiment of the present invention and which utensil is generally designated by reference numeral 10.

Utensil 10 includes a first elongated member 12 and a second elongated member 14, members 12 and 14 being pivotally connected by a pivot pin 16. Both the first and second members 12, 14 have respective first and second handle sections 18, 20 and first and second jaw sections 22, 24. Second jaw 24 has an inner edge 25 and outer edge 27.

As may be seen, second jaw section 24 is provided with an open cutting notch or elongated slot 26 that extends towards a distal tip 28 of jaw 24.

The cutting notch 26 includes a cutting apex 30 and a cutting edge 32.

As shown more specifically in FIGS. 2, 5 and 6, the first jaw section 22 has a jaw recessed section 34 forming an inner jaw cutting edge 36 opposite outer edge 35. The first and second jaw sections 22, 24 are configured, sized and positioned so that the jaw cutting edge 36 may cooperate with the notch cutting edge 32 in a scissors like manner and the first and second members 12, 14 are pivoted alternatively about pivot pin 16 between their opened and closed configurations shown respectively in FIGS. 2 and 3.

Thus, as may be seen above, first and second jaw members 22 and 24 respectively may be used in a scissors like manner to cut a thicker portion of a shell or to initiate the cutting action. Second jaw member 24 may then continue cutting the shell. It will be understood that one could use only the cutting action of second jaw member 24 if so desired. In other words, the utensil may be used in the manner of scissors when required in order to initiate or continue a cutting action depending upon the shell being severed. At the same time, a cutting action may be achieved solely through the use of second jaw member 24 once the cutting action has been initiated.

The configuration of notch or slot 26 allows for a pulling action between the utensil 10 and the shell being severed or opened. The arrangement permits for an ergonomical grip on both the utensil and the object being cut and reduces the risk of a potential injury to the intented user.

The specific configuration of the cutting apex and edge 30, 32 respectively takes advantage of the structural characteristics of shellfish or crustacean shells. Thus, the shell is designed inherently to offer maximum protection from outside attack and thus exhibits great strength and compression.

However, the shell can be easily severed when exposed to inside severing or shearing pressure since the shell is designed to allow the crustacean to shed its shell as it grows and thus the shell is relatively weak in tension.

The proposed tool 10 takes advantage of these shell structural characteristics by using a relatively thick apex and a cutting edge 30, 32 that applies a cutting pressure from the inside of the shell and thereby facilitates separation of meat from the shell with relatively little effort. In initiating the cutting action or when an additional cutting strength is needed, a selective severing or cutting pressure may be applied to the exterior surface of the shell 40 by the cutting edge 36 of the first jaw member 22.

As previously mentionned, there is provided a generally concave external groove 44 which extends from the recess or slot to a distal end of second jaw member 24. Concave external groove 44 functions to permit an easy opening of the shell being cut—i.e. it provides a reduced thickness section to allow the utensil to move smoothly through the shell. Also, external groove 44 may be used for removing meat from the shell.

Preferably, both the first and second handle sections 18, 20 are provided with handle finishing plates 46, 48 that are mounted to their respective body handles by conventional fixing means 50 such as screws, rivets or the like.

Also, preferably, the handle sections are complementarity shaped so as to form a generally united body when the lever members are in their closed position and are configured and sized so as to provide an ergonomical grip.

Typically, the first handle section 12 includes an outwardly arcuate section 52 and a hooked end 54 to facilitate the ergonomical gripping thereof.

Preferably, utensil 10 is further provided with a biasing means for biasing the elongated members towards an open configuration shown in FIGS. 1, 2, 5 and 7 and a releasable locking means for releasable locking the members in their closed configuration as shown in FIGS. 3 and 8 through 10. Since the pulling action on the tool exerts a pressure of the jaw member 22 against the shell therefore moving the member 12 toward an opened configuration, one could easily use the tool without a biasing mean.

As shown in FIGS. 7 through 10, the biasing means preferably includes a spring wire 56 wound about the sleeve 58 of the hinge component 16. A first and second internal recess 60, 62 is respectively formed on the inner surface of the first and second jaw members 20, 24 adjacent the hinge component 16.

The first and second inner recesses 60, 62 together form an enclosure for the spring component 56. The first and second internal recesses 60, 62 also define corresponding abutment edges for the first and second protruding legs 64, 66 of the spring wire component 56.

The releasable locking means includes a locking component 68 that defines a cylindrical locking pin section 70 protruding integrally from a push button section 72.

A push button section 72 is slidably inserted within a corresponding push button aperture 74 formed in the second jaw member 24. A locking aperture 76 extends through the first locking jaw 22. The locking aperture 76 is configured and sized for slidably receiving the locking pin section 70 of the locking component 68.

The second leg 66 of the spring component 56 is solidly attached to the push button section 72 of the locking component 68 preferably by passing therethrough.

Figure 8:
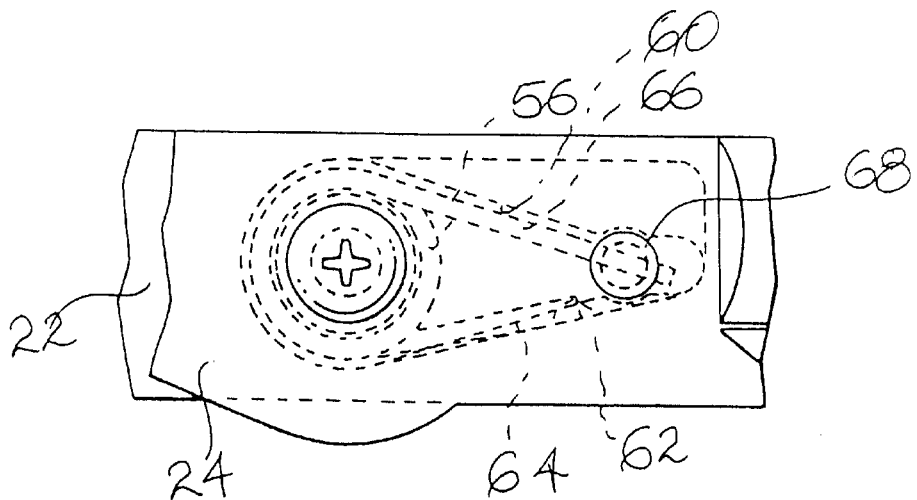
FIG. 8 is a detailed front elevational view with sections taken out, illustrating part of a biasing mechanism for biasing the members which are closed towards a predetermined configuration.
Figure 9:
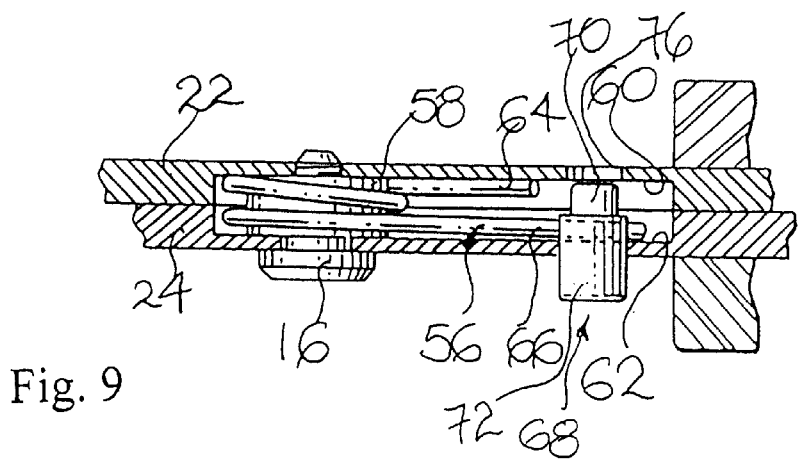
FIG. 9 is a partial longitudinal view with sections taken out, illustrating part of a locking mechanism for locking the members in a predetermined closed configuration relative to each other with locking mechanism being shown in an unlocked configuration.
Figure 10:
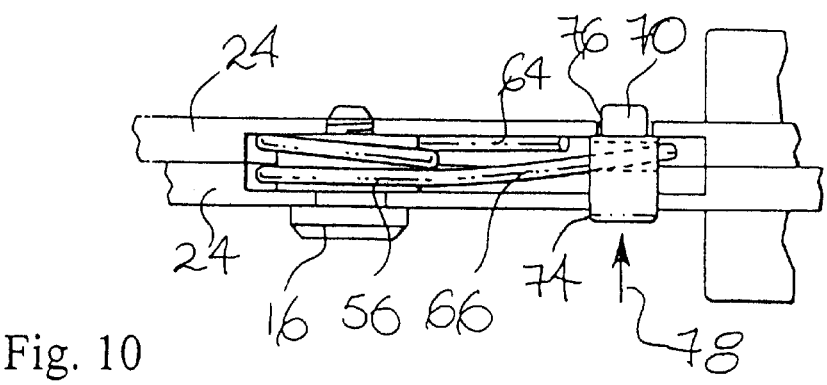
FIG. 10 is a partial longitudinal view with sections taken out, illustrating part of the locking mechanism with the locking mechanism being shown in a locked configuration.

As shown in FIGS. 8 and 10, in order to lock the lever members 12 and 14 in their closed configuration the fingers of the intended user push the push button section 72 of the locking component 68 in a direction indicated by arrow LXXVIII until the locking pin section 70 slides into the locking aperture 76. This causes the second leg 66 to deform laterally as shown in FIG. 10. A locking notch on the external surface of the locking pin 70 and the surface of the locking aperture 76 created by the deformation of the locking legs 64, 66 by the pivotal movement of the members 12 and 14 towards their closed configuration, prevents second leg 66 from biasing the locking pin section 70 out of the locking aperture 76 back to its original configuration shown in FIG. 9.

In order to release the locking action of the locking pin 70, an intended user merely needs to apply an initial grasping pressure between the first and second handle sections 18, 20. The slight resulting pivotal movement between the members 12, 14 reduces the frictional contact between the locking pin 70 and the locking aperture 76 allowing the second leg 66 to bias the locking pin 70 out of the locking aperture 76 towards the position shown in FIG. 9.

Figure 11:
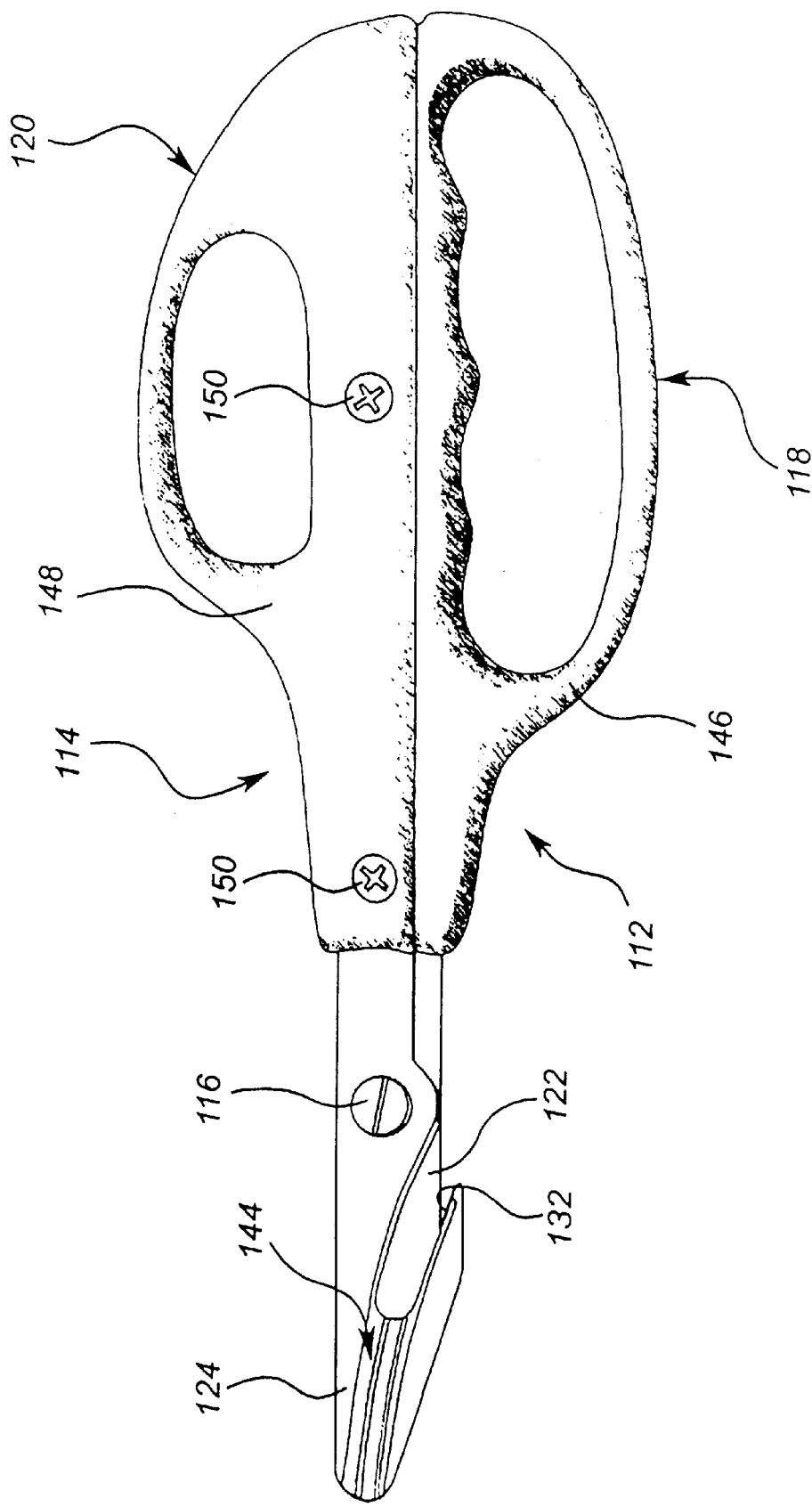
FIG. 11 is a front elevational view of a further embodiment of the utensil of the present invention with the jaws being closed.

In the embodiment shown in FIG. 11, similar reference numerals in the 100s are utilized for similar components in the embodiments shown in FIGS. 1 to 10.

In the embodiment of FIG. 11, there are provided a first elongated member 112 and a second elongated member 114 pivotally connected together by means of a screw threaded arrangement 116. There are provided a first handle 118 which is of a type commonly found on scissors or the like along with a second handle 120.

As will be noted in FIG. 11, handle sections 118 and 120 are provided with finishing members 146 and 148 that are mounted to their respective elongated member by screws 150. It will also be noted that in this embodiment, concave external groove 144 extends from cutting edge 132 to a distal end of the jaw.

It will be understood that the above described embodiment is for purposes of illustration only and changes or modifications may be made thereto without departing from the spirit and scope of the invention.

I claim:

1. A utensil suitable for opening shellfish comprising:
    a first elongated member having a first handle at a first end thereof and a first jaw at a second end thereof;
    a second elongated member having a second handle at a first end thereof and a second jaw at a second end thereof;
    said first and second elongated members being pivotally connected together and being pivotally moveable between a jaw open position and a jaw closed position;
    said first jaw having a first jaw outer side edge and a first jaw inner side edge;
    said second jaw having a second jaw outer side edge and a second jaw inner side edge;
    said first jaw inner side edge and said second jaw inner side edge being in a facing relationship when said first and second elongated members are in said open position; and
    said second jaw having a recess extending inwardly from said second jaw outer side edge, said recess being defined by a recess side wall, said recess side wall having a cutting edge extending along at least a portion thereof.

2. The utensil of claim 1 wherein said recess has an elongated slot configuration, said elongated slot extending generally from said second jaw outer side edge in a direction towards a distal end of said second jaw.

3. The utensil of claim 2 wherein said recess side wall has first and second recess side wall portions, an end wall portion intermediate said recess side wall portions, said first side wall portion and said end wall portion having said cutting edge formed thereon.

4. The utensil of claim 2 wherein said first and second elongated members are connected intermediate respective handles and jaws.

5. The utensil of claim 2 wherein said first and second elongated members are pivotally connected proximate their respective jaws.

6. The utensil of claim 1 wherein said first and second members are pivotally connected so as to provide a space therebetween to facilitate cleaning thereof.

7. The utensil of claim 1 further including biasing means to bias said elongated members to an open position.

8. The utensil of claim 1 further including locking means to maintain said members in a closed position.

9. The utensil of claim 2 wherein said first jaw inner side edge has a cutting edge formed thereon, said cutting edge being located such that when said members move from said jaw open position to said jaw closed position, said cutting edge on said first jaw inner side edge and said cutting edge on said recess side wall function as a pair of scissors.

10. The utensil of claim 1 wherein said first jaw has a concave groove formed on the exterior surface thereof, said groove extending from said recess to a distal end of said first jaw of said jaw.

11. The utensil of claim 1 wherein said first and second elongated members are connected together by means of a rivet.

12. The utensil of claim 1 wherein said first and second elongated members are connected together by means of a screw threaded arrangement.

13. A utensil suitable for opening shellfish comprising:
a first elongated member having a first handle at a first end thereof and a first jaw at a second end thereof;
a second elongated member having a second handle at a first end thereof and a second jaw at a second end thereof;
said first and second elongated members being pivotally connected together and being pivotally moveable between a jaw open position and a jaw closed position;
said first jaw having a first jaw outer side edge and a first jaw inner side edge;
said second jaw having a second jaw outer side edge and a second jaw inner side edge;
said first jaw inner side edge and said second jaw inner side edge being in a facing relationship when said first and second elongated members are in said jaw open position;
said second jaw having a recess extending inwardly from said second jaw outer side edge; and
said first jaw inner side edge extending over a portion of said recess when in a jaw closed position.

14. The utensil of claim 13 wherein said recess has an elongated slot configuration extending generally from said second jaw outer side edge in a direction towards a distal end of said first jaw.

15. The utensil of claim 14 wherein said recess has a side wall, said side wall having has first and second recess side wall portions, an end wall portion intermediate said recess side wall portions, said first side wall portion and said end wall portion having a cutting edge formed thereon.

16. The utensil of claim 13 wherein said first jaw inner side edge has a cutting edge formed thereon, said cutting edge being located such that when said members move from said jaw open position to said jaw closed position, said cutting edge on said first jaw inner side edge and a cutting edge on a side wall of said recess function as a pair of scissors.

* * * * *